Figure 1:
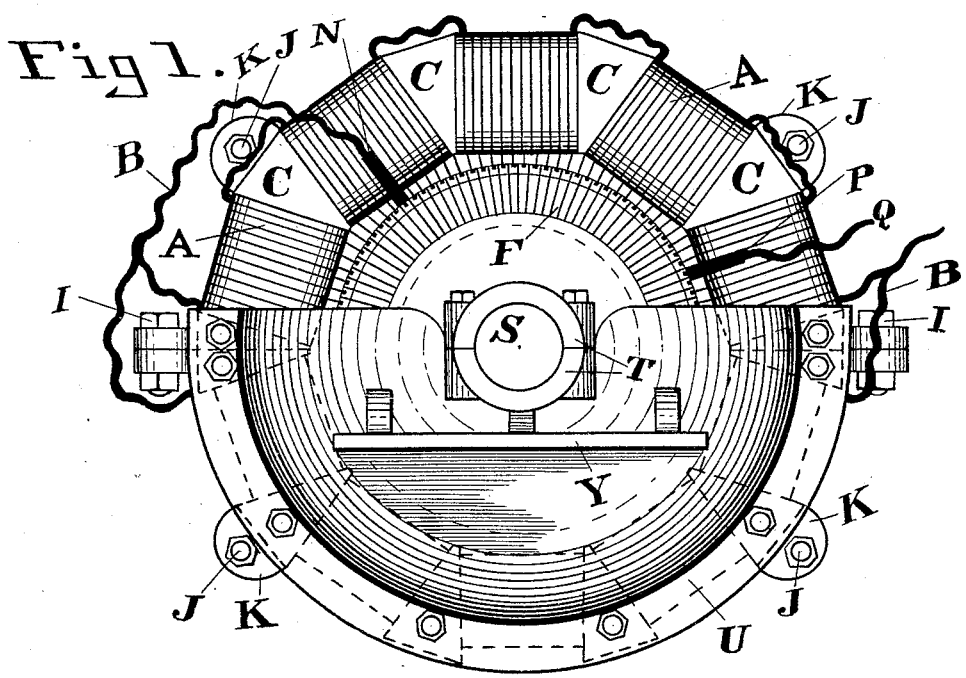

(No Model.) 3 Sheets—Sheet 1.

W. L. SILVEY.
ELECTRIC MOTOR.

No. 524,407. Patented Aug. 14, 1894.

Attest:
E. B. Lehman
C. U. Raymond

Inventor.
William L. Silvey (No Model.) 3 Sheets—Sheet 2.
W. L. SILVEY.
ELECTRIC MOTOR.
No. 524,407. Patented Aug. 14, 1894.
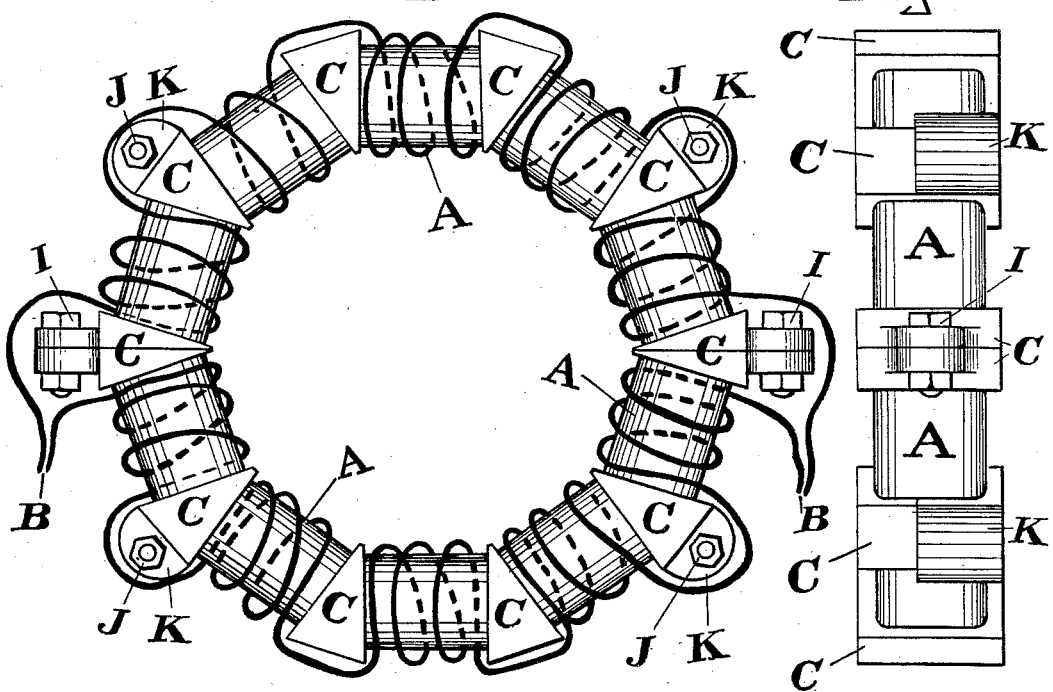
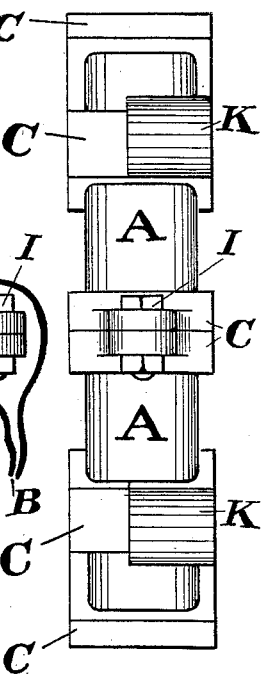
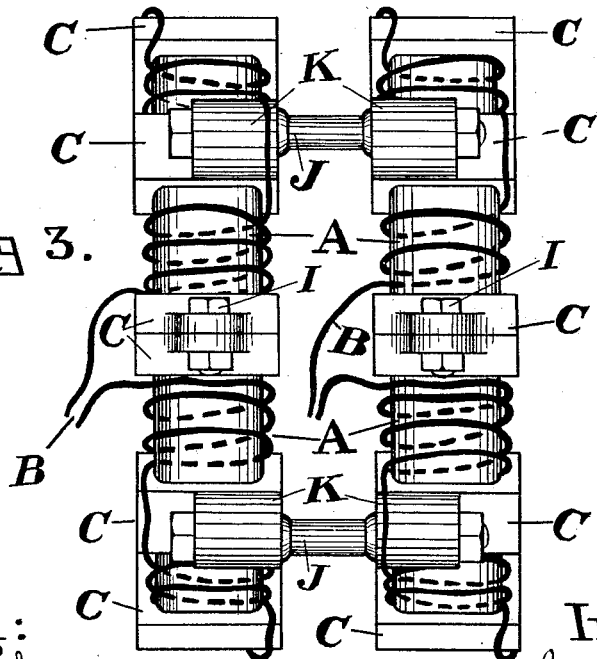
Attest:
E. B. Lehman
J. Kirby
Inventor.
William L. Silvey
THE NORRIS PETERS CO., PHOTO-LITHO., WASHINGTON, D. C.

(No Model.) 3 Sheets—Sheet 3.

W. L. SILVEY.
ELECTRIC MOTOR.

No. 524,407. Patented Aug. 14, 1894.

Attest:
E. B. Lehman
J. Kirby Jr.

Inventor.
William L. Silvey

UNITED STATES PATENT OFFICE.

WILLIAM L. SILVEY, OF DAYTON, OHIO.

ELECTRIC MOTOR.

SPECIFICATION forming part of Letters Patent No. 524,407, dated August 14, 1894.

Application filed March 2, 1894. Serial No. 502,084. (No model.)

*To all whom it may concern:*

Be it known that I, WILLIAM L. SILVEY, a citizen of the United States, and a resident of Dayton, in the county of Montgomery and State of Ohio, have invented certain new and useful Improvements in Electric Motors, of which the following is a specification.

In referring to this invention under the title of electric motor, I wish it understood that the machine is equally adaptable to the generation of electricity, in which case it might be called a dynamo electric machine, but I shall not especially describe its action under this title for the reversibility of electric motors is too well known to require this minute description, and therefore my invention relates to improvements in electric machines called electric motors or dynamo electric machines.

My invention relates to improvements in electric motors in which circular field magnets are in combination with a circular armature and the means by which I am able to produce a machine designed to produce several times the output in ampères with about the same voltage which could be derived from a machine of the two pole type. In order to accomplish this result, I never have less than four poles and may have as many as twenty or more poles in the field magnet, the machine shown in my drawings having ten poles in the ring field magnets and armature. With this object in view I employ in association with stationary field magnet rings, the sides of which are substantially parallel, a magnetized armature of annular form, which rotates between the two field magnet rings in the plane of its own curvature about an axis coincident with the bisecting line of the field magnets and armature, the plane being at right angles to a circular line passing through the field magnet core intersecting its poles. The magnetism of both these members is originated by enveloping helices so arranged and operated as to produce in the field magnet a constant polarity and to produce on alternate pole pieces of the field magnet ring a constant terminal polarity and to produce at intervals in the armature ring a polarity which is reversed during each rotation as often as there are alternate poles in the field magnet. One effect of this arrangement is that the armature during its revolution approaches or recedes from the respective field magnet polar projections in a line, which is nearly a tangent of rotation, and therefore the magnetic pull is exerted in a nearly direct line to that of rotation. One effect of my arrangement is that the coils of the armature during its entire revolution are constantly in a powerful magnetic field, consequently there are no dead coils, but all the coils are at all times subject to inductive action whereby the armature is made to rotate before the poles or consequent points, before the whole length of the field magnet and wires surrounding the same and through the entire field of force all at the same time, and therefore the entire armature being constantly bathed in such a powerful magnetic influence as to produce improved results.

Figure 2:
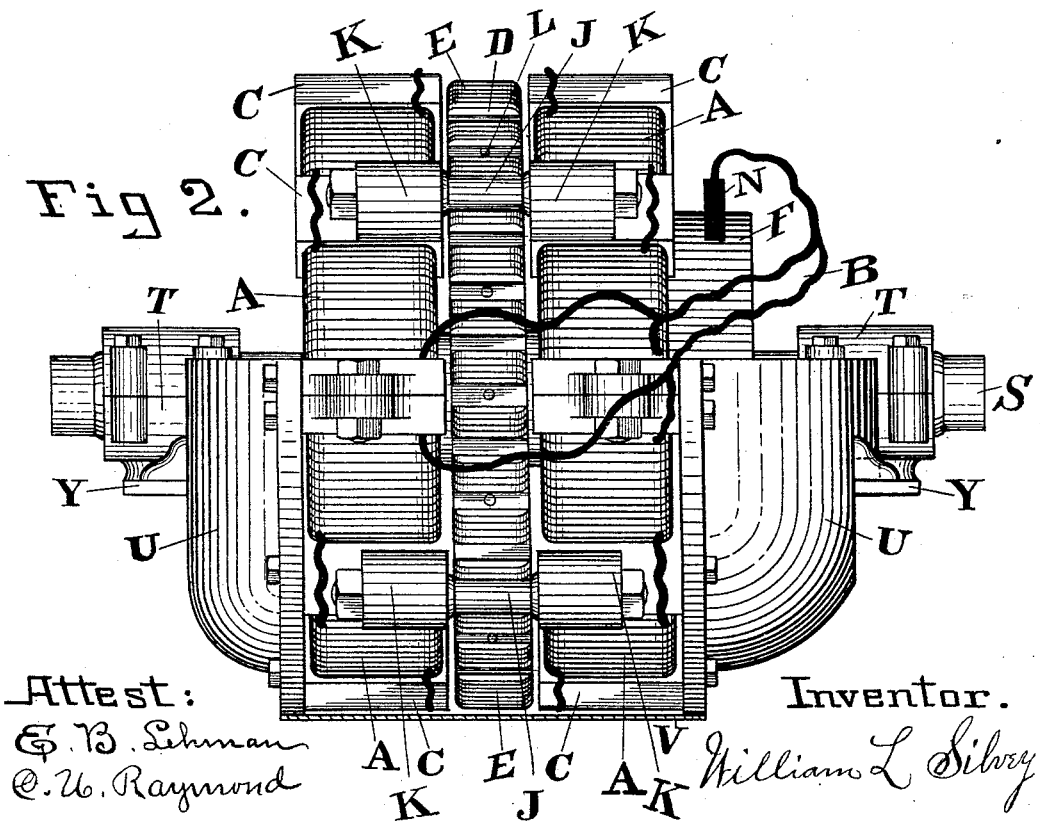
Figure 7:
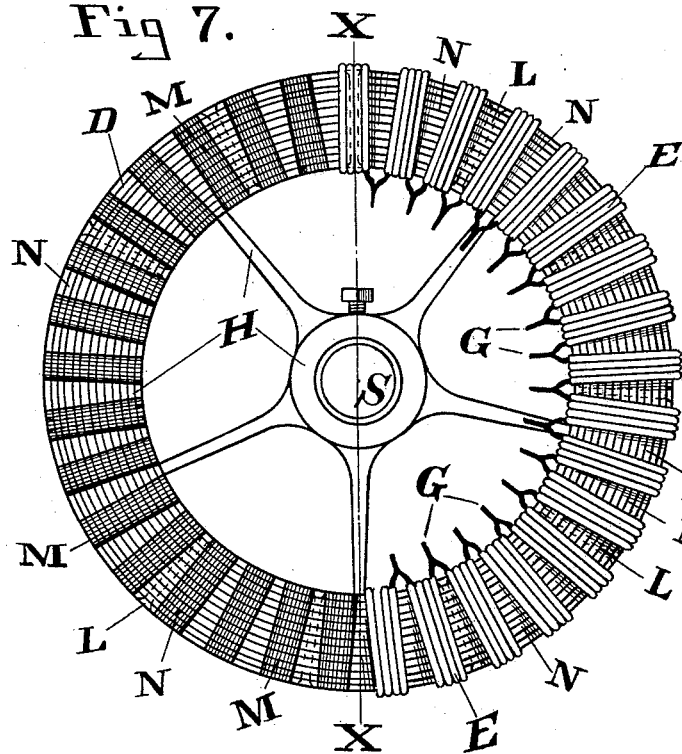
Figure 8:
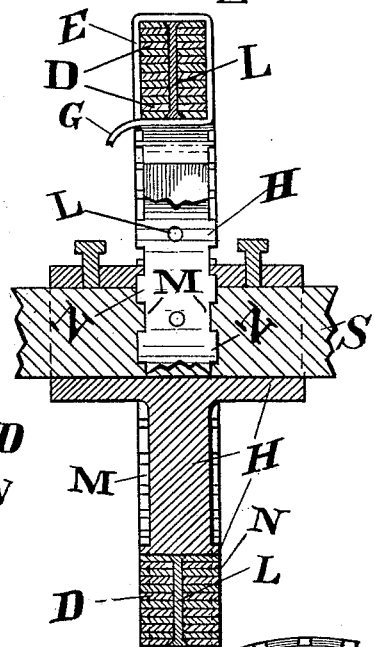
Figure 9:
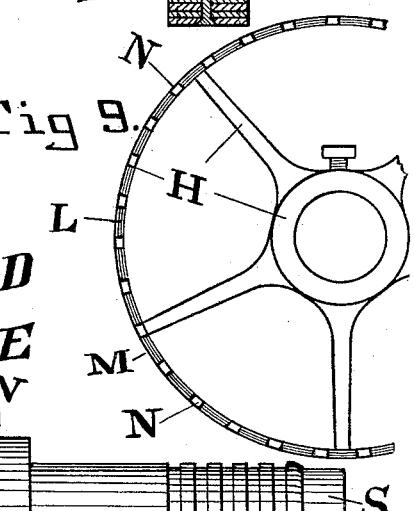
Figure 6:
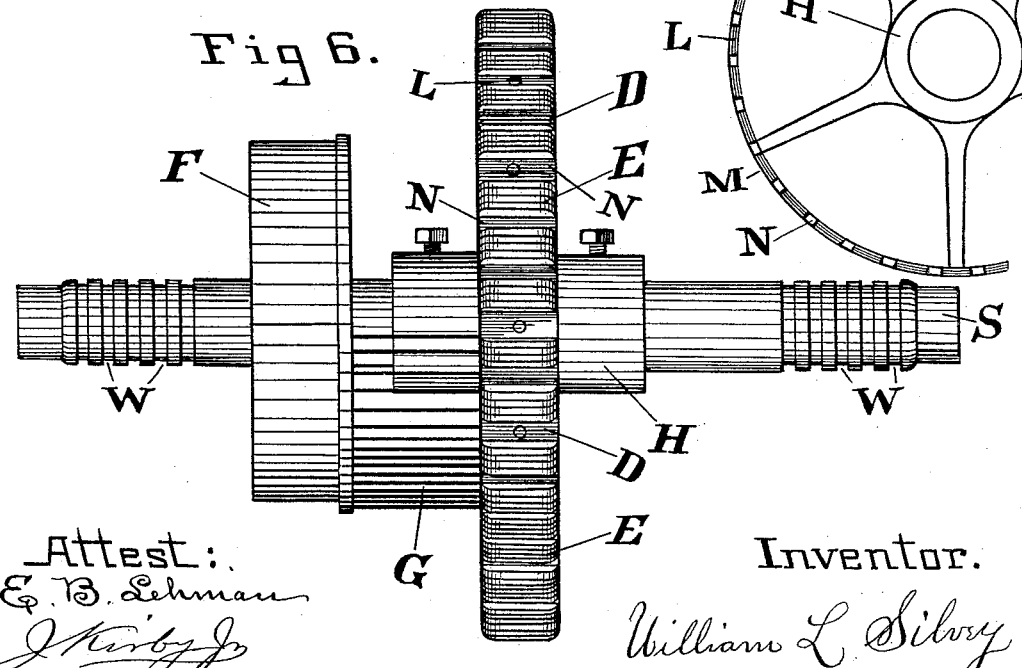

Referring to the accompanying drawings which are made a part hereof, in which similar letters refer to similar parts, Figure 1, is a front end view of a machine made according to my invention. Fig. 2, is a side view of a machine made according to my invention. Fig. 3, shows an edge view of the field magnet rings with convolutions of wire wound on them. Fig. 4, shows a side view of one of the field magnet rings A showing wire B wound around it and by which means alternate north and south poles are produced in polar extension C of the field magnet ring. Fig. 5, is an edge view of field magnet ring A with the winding of wire omitted. Fig. 6, shows an edge view of the armature ring D wound with coils of wire, the lower half of the armature coils E electrically connected to a multiple bar commutator F by suitable connecting wires G. Fig. 7, is a side view of my improved armature ring D mounted on a suitable spider H and having the ring partially wound with coils of wire E, the remainder of the armature ring unwound in order to more clearly illustrate its construction. Fig. 8, is a cross section of Fig. 7 along the vertical line X X. Fig. 9 is a partial view of the armature spider H in order to shown the general form.

Referring to the accompanying drawings, the field magnets consist essentially of two rings of iron or cast steel, A, having polar extensions C, extending out from the side of the ring, the two rings arranged so as to be practically parallel with each other and between these two rings a suitable disk armature is made to revolve.

In constructing my field magnet rings, I have found it advantageous to make the ring A between the polar extensions C practically straight, the heads or ends being substantially parallel for the reason that in inventions on which I have previously received United States patents in which the ring is curved, I have found it a difficult matter to wind the coils symmetrically, and for this reason I have in this invention made my wire space uniform throughout. I have also found that instead of making the wire space a segment of a circle, it is very advantageous to make the field magnet core straight between the pole pieces C as is fully illustrated in Figs. 1 and 4.

The field magnets consist of a cast steel or soft iron ring having wedge shaped pole pieces C. This wedge shaped pole piece has its narrowest point projecting inward, before the end of which the ring armature D revolves. This pole piece C is made comparatively narrow, being only sufficient to properly carry the magnetism of the field magnets for I have found that a multipolar machine does not require the poles to expand as much on the armature face as a machine having only two polar projections.

The field magnets consist essentially of two rings of magnetic material A having projecting pole pieces C. Each of these rings may be made in one piece, but I have found it advantageous to make them in at least two parts as shown, the separation being for the purpose of winding the wires B with which they are surrounded. The parts of the ring are preferably united together by means of bolts I, by which the parts of the ring are firmly clamped together, and by which a complete magnetic circuit is formed.

The two magnetic rings constituting the field magnets are held firmly together and properly separated by bolts J, or other suitable device, but I have found it most convenient to cast lugs K onto the field magnet ring through which the bolts or studs pass, and to which they are secured by suitable screw threaded nuts.

The armature consists of a spider H having a suitable integral hub and non-magnetic rim as shown in Figs. 7, 8 and 9, around which are wound numerous layers of soft sheet iron D. An examination of my drawings, more especially Figs. 8 and 9, disclose the fact that my spider is preferably made integral as similar letters refer to similar parts and the letter H will be found to refer to the rim hub and spokes of the spider which in order to prevent loss of magnetism is made non magnetic. After the sheet iron has been wound round the rim of the spider as closely as possible, numerous pins or rivets L are placed through the sheets and rim of the spider, whereby they are firmly united together into a hollow wheel as shown in Fig. 7, the strips of sheet iron D fastened to the spider rim constituting the rim of the wheel. After the armature ring has been properly fastened together the faces or sides are now reduced to proper uniform dimensions, and there is milled into the two opposite faces of the ring numerous radial slots M into which convolutions of wire E are wound. By winding the coils of wire E into the slots, all liability of displacement of the coils is avoided; besides the coils serve the useful purpose of partially binding the spider rim and the sheet iron together, and the coils are surrounded on three sides by the iron, thereby deriving great magnetic power from a given amount of electric current and at the same time it enables the armature to revolve in very close proximity to the coils of wire on the field magnets, and the pole pieces C, and whereby great counter magnetic attraction and repulsion are produced. It will also be observed that in the field magnets the coils of magnetizing wire are wound in grooves between the polar extensions C, and therefore the field magnet wires B are surrounded on three sides by the iron in the field magnet ring.

By winding the coils of both the field magnets and armature in grooves besides preventing displacement of the coils, I am able to gather up and direct into useful channels the magnetism of the end of the coils, whereas in most machines this magnetism is dissipated or forms air circuits similar to those in the hedgehog transformer.

In machines made according to my invention, the field magnets being closed, magnetic rings with numerous consequent poles C disposed at short intervals around it, and with a ring armature revolving in close proximity to the rings it will be observed that my armature is entirely surrounded on two sides by powerful magnets. The magnetism generated in the armature ring D passes to the field magnet through the teeth N between the coils which revolve in very close proximity to the coils and polar extensions in the field magnets and therefore a most powerful torque is produced. The coils E in the armature are wound and connected together so as to produce a closed magnetic ring, having as many shifting consequent poles as there are poles in the field magnets. The preferable way to accomplish this is to wind the coils after a plan, known as the Gramme armature winding, connected to the multiple bar commutator F, and by means of conductors G and suitable brushes P N, with the field magnet circuit and the external circuit.

It is evident that this machine may be connected (electrically) in various ways without departing from the spirit of my invention, as for instance in multiple circuit in plain series or any combination of these, but the method which I have found by experience best is to connect the two field magnet rings into two parallel circuits. The advantage of paralleling is that the ring having the fewest convolutions and lowest resistance will receive the largest volume of current and consequently the magnetism will be evenly balanced in the two rings. I have also found it advantageous to connect the two sides of each field magnet ring in parallel as shown in Figs. 3 and 4. In this case the current entering at one side of the field magnet ring divides into two circuits and escapes at the opposite side, by means of which the two circuits (by magnetic induction) and the magnetism of the two limbs of the field magnet ring are magnetically balanced. The armature ring being completed and wound is mounted on a suitable shaft S which is hung in suitable journal boxes T secured to suitable supporting frames U U, one at each end of the motor. It will be observed that the supporting frames are made arched and semicircular for the purpose of giving them rigidity and to nearly inclose the commutator F so that the case V shown in section in Fig. 2 when bent around the outer circumference of the supporting frame U will form a waterproof casing half way inclosing the motor.

The form of motor shown in the drawings is particularly adaptable to driving street cars and other moving vehicles. The grooves W in the shaft S at each end are filled with Babbitt metal when babbitting the journal boxes T, by which all lateral motion of the armature is prevented, keeping it centrally located between the field magnet rings and forming a magnetic balance. The grooves also serve to prevent the supporting frames from receiving unequal strains for they being both arched outward, a strain on the concave side of one end, is immediately checked by a counter strain on the convex side of the other end. It will be seen that the shaft S forms a central support for the armature and the field magnet rings A, which in turn are bound together by the arched ends U and they are in turn bound together by the bolts or studs J.

The whole machine is supported by brackets Y, one at each end making a compact machine and one particularly adapted to traction service.

Having described the essential features of my invention, what I claim as new, and wish to secure by Letters Patent of the United States, is—

1. A field magnet for electric machines consisting of two wire wound electro-magnetic rings A A having pole pieces of alternate polarity projecting from their sides between the coils of the rings, the two rings united together by rods passing through lugs K which form part of the pole pieces of the two rings as set forth.

2. In an electric motor the combination of two ring field magnets A having polar projections C of the studs J, the end plates U secured to the field magnets, the end plates carrying the journal boxes T, an armature shaft S having numerous grooves babbitted in the journal boxes, the shaft carrying a spider H and armature ring D, on which armature coils E are wound and connected to a suitable commutator, the whole arranged to operate as and for the purpose set forth.

In testimony whereof I have set my hand in presence of two subscribing witnesses.

WILLIAM L. SILVEY.

Witnesses:
C. U. RAYMOND,
H. S. MILLER.